March 4, 1969  M. S. SHINBAUM ET AL  3,430,481

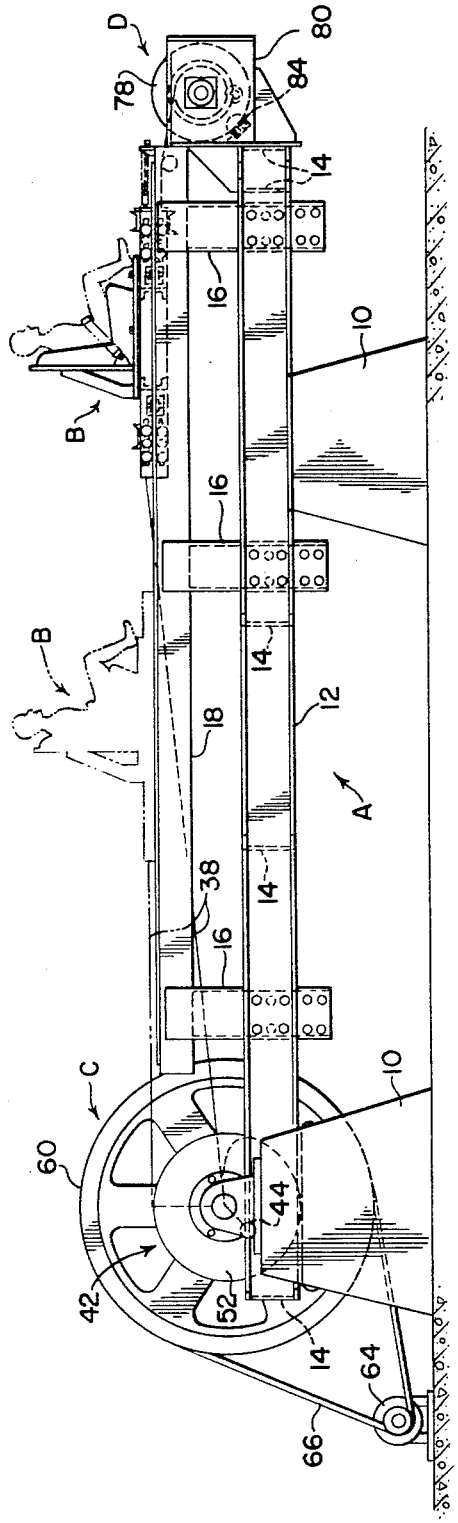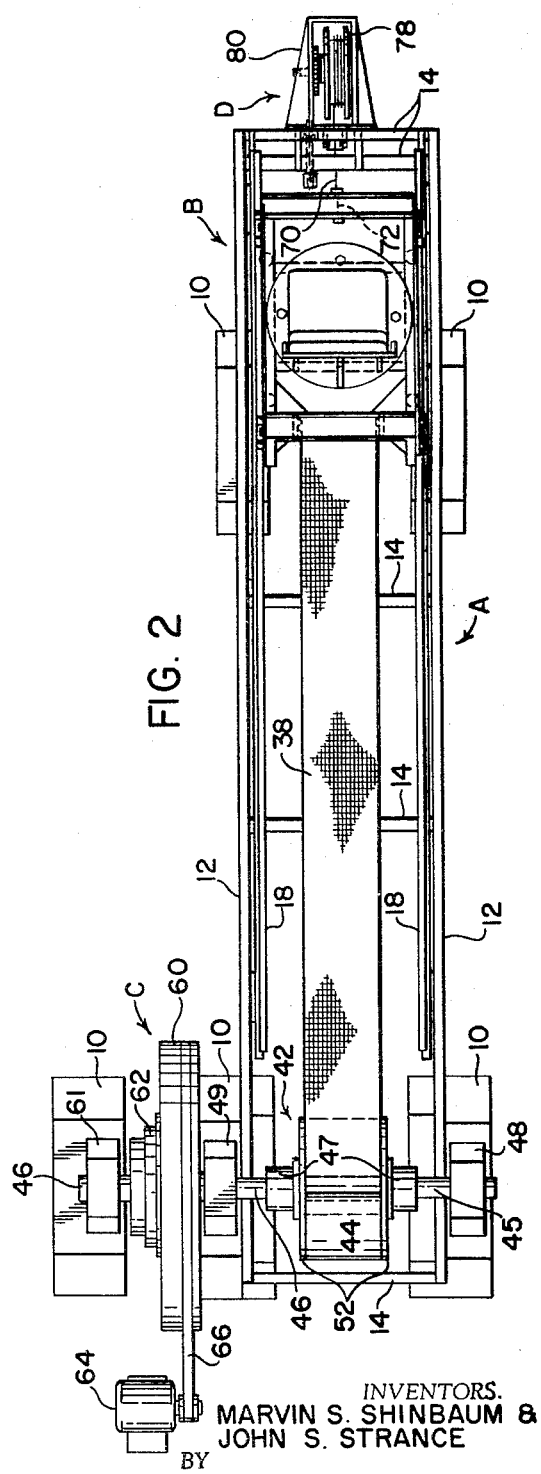

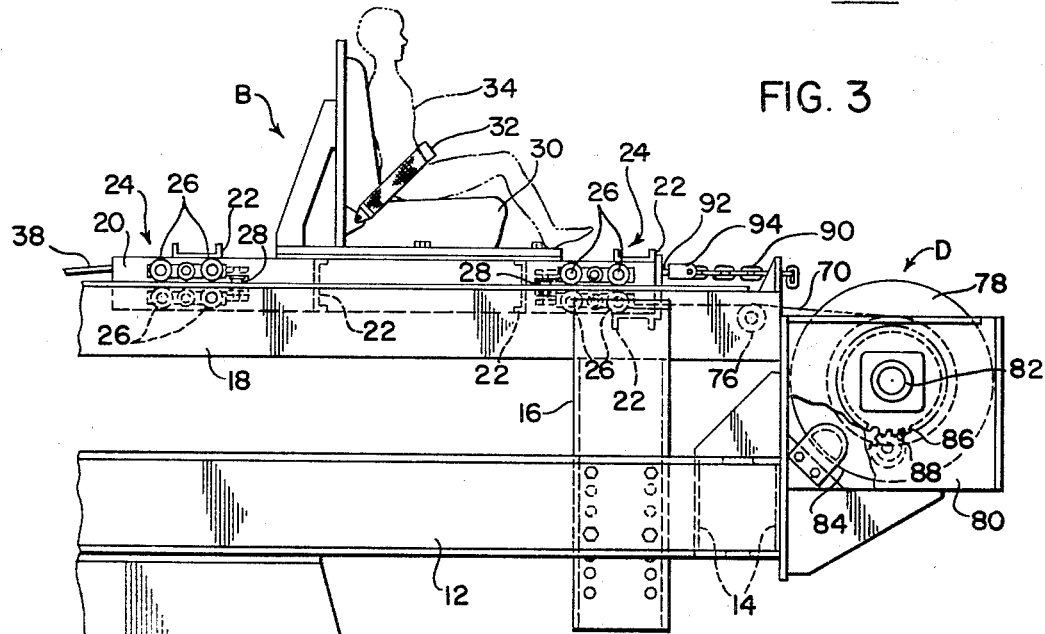
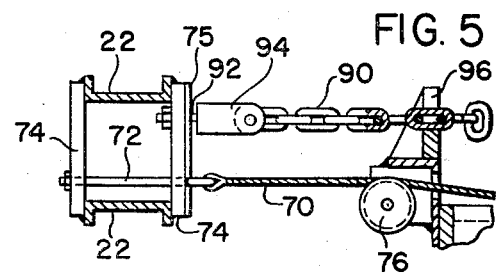
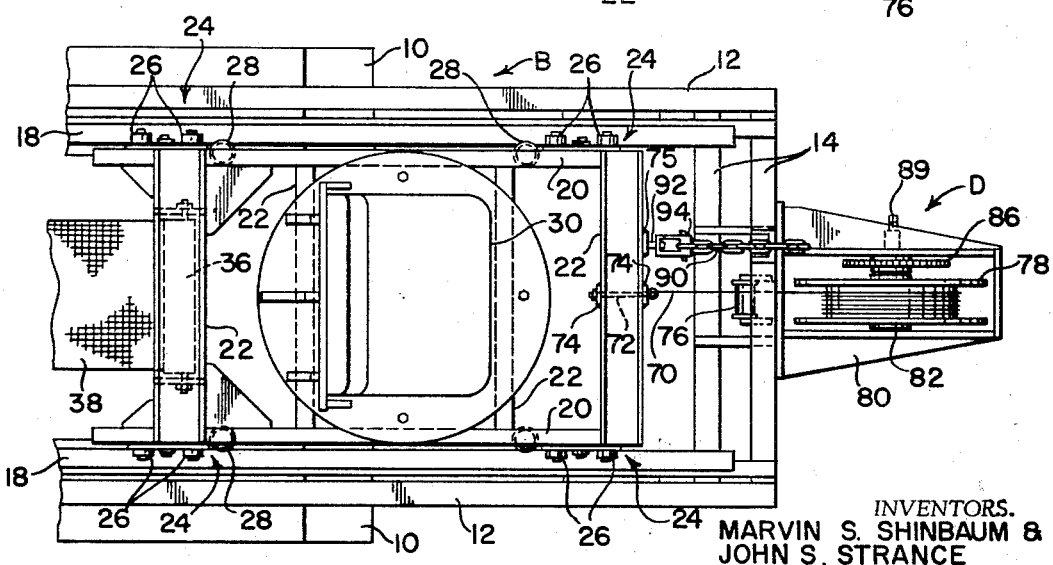

DYNAMIC TEST MACHINE

Filed Nov. 16, 1966

INVENTORS.
MARVIN S. SHINBAUM &
JOHN S. STRANCE

BY *Meyer, Tilberry & Body*

ATTORNEYS

United States Patent Office 3,430,481
Patented Mar. 4, 1969

3,430,481
DYNAMIC TEST MACHINE
Marvin S. Shinbaum, Springfield, and John S. Strance, Drexel Hill, Pa., assignors to E. W. Bliss Company, Canton, Ohio, a corporation of Delaware
Filed Nov. 16, 1966, Ser. No. 594,874
U.S. Cl. 73—12
Int. Cl. G01n 3/08
5 Claims

ABSTRACT OF THE DISCLOSURE

An improved dynamic test machine of the type including: a guideway along which a test vehicle is movable between first and second positions; a winding reel having a contoured winding surface connected through an elongated flexible tension member with the test vehicle; power means selectively connectable to the winding reel for rapidly rotating the reel to wind up the tension member and, considering the contour of the winding surface, applying a predetermined acceleration to the test vehicle to move it from the first position toward the second position. The machine is provided with the improvement which includes braking means including a rotatable drum member provided with actuable means for selectively applying a braking force to the drum member and a second elongated flexible tension member having one end connected to the drum and wound thereon and the other end connected to the test vehicles.

---

The present invention relates to the art of dynamic testing and more particularly to a machine for precisely simulating crash impact forces.

The invention is particularly applicable for testing passenger restraint devices, such as seat belts, and will be described with particular reference thereto; however, it is appreciated the invention is capable of broader applications and could be used wherever it is desired to subject an object to high acceleration forces of generally known magnitudes.

Present apparatus for simulating crash impact forces generally includes apparatus such as rocket sled accelerators and hydraulic rams accelerators. Both of these types of apparatus have substantial drawbacks. For example, the rocket sled accelerators require long test tracks which, because of their great length, are usually located out-of-doors. This makes any testing program subject to weather conditions. Additionally, because of the use of large consumable rockets for power, these rocket sled accelerators are expensive to operate. These devices usually exert impact stresses at the end of the cycle; therefore, controlled stopping is the sought after condition. This can be difficult without having an actual crash between the sled and an abutment which is highly damaging to the test apparatus.

Hydraulic ram accelerators likewise have several drawbacks. Like rocket sled accelerators, they are of large size and, consequently, costly to build. Also, they require relatively complex control systems. As a result, these accelerators tend to have a large first cost, in addition to high operating costs.

The present invention overcomes the problems and disadvantages of presently used dynamic test machines and provides a relatively compact machine which can simulate crash impact or rapid deceleration forces economically and with the required certainty of operation.

The subject test machine simulates crash impact forces by applying a controlled, extremely rapid, acceleration to a test vehicle on which is carried the component being tested. The forces applied to the component during this controlled acceleration period are equivalent, in effect, to those applied during the deceleration caused by a crash impact. Consequently, an actual crash is not required.

In accordance with the present invention, a dynamic test machine is provided comprising a test vehicle movable between first and second positions on a guideway. Means are provided to rapidly accelerate the test vehicle from a first to a second velocity at a desired rate. These means comprise an elongated tension member drivingly connected to the vehicle, and an energy source which is selectively drivingly connected with the tension member for accelerating the tension member and the vehicle from the first to the second velocity. Additionally, means are provided for applying a desired pre-tensioning stress to the tension member prior to the time the energy source is connected to it.

In accordance with a broader aspect of the present invention is the provision of a dynamic test machine comprising a test vehicle movable in a generally straight line between a first and a second position, a reel with a central reeling surface, and a flat tape woven from synthetic material. The tape connects the reel and vehicle, and it is coilable onto the reeling surface to pull the vehicle between the first and second positions. There are also provided a flywheel, a drive unit for rotating the flywheel, and a clutch means for connecting the rotating flywheel with the reel to coil the tape onto the reel and accelerate the vehicle.

An object of the present invention is the provision of a dynamic test machine that is less complex than prior similar devices of this type and is highly reliable in operation.

An additional object of the present invention is the provision of a dynamic test machine that is relatively compact, especially with regard to length but capable of performing tests equal to those of larger prior test machines.

A further object of the present invention is the provision of a dynamic test machine that is capable of producing extremely rapid controlled acceleration without the use of complicated control systems.

Still another object of the present invention is the provision of a dynamic test machine that is inexpensive to construct and operate.

Another object of the present invention is the provision of an improved dynamic test machine which performs the testing function during acceleration, instead of during deceleration, and which machine uses an accelerated flat woven tape as a primary element.

These and other objects and advantages will become apparent from the following description used to illustrate the preferred embodiment of the invention as read in connection with the accompanying drawings in which:

FIGURE 1 is an elevational view of the dynamic test machine of the present invention;

FIGURE 2 is a plan view of the machine shown in FIGURE 1;

FIGURE 3 is an enlarged view of the right end of the machine shown in FIGURE 1;

FIGURE 4 is an enlarged plan view of the right end of FIGURE 2;

FIGURE 5 is an enlarged view of one of the breakaway link assembly of the present invention;

Figure 6:
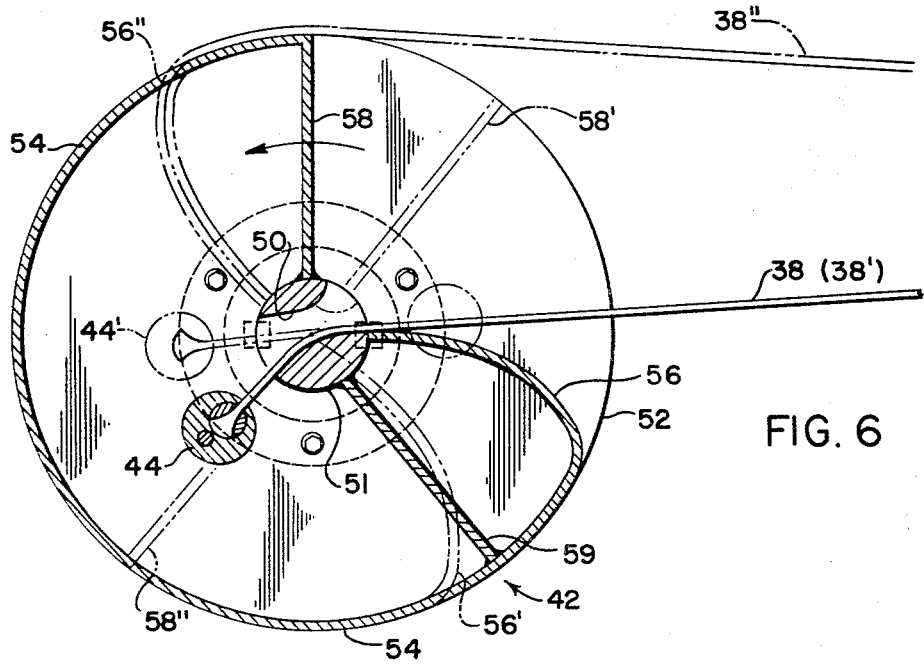
FIGURE 6 is an enlarged cross-sectional view taken on line 6—6 of FIGURE 2.

Referring now to the drawings where the showings are for the purpose of illustrating a preferred embodiment of the invention only and not for the purpose of limiting same, FIGURE 1 shows the overall arrangement of the dynamic test machine of the present invention comprising main frame A, test sled assembly B, drive assembly C, and brake pre-tensioning and rewind assembly D.

The particular construction used for frame A is not important, however, as best shown in FIGURES 1 and 2 the construction used in the preferred embodiment is comprised of a pair of horizontally positioned beams 12 mounted on four piers 10. A plurality of cross braces 14 extend between the beams 12 to form a rigid support frame for the test track. The test track comprises a pair of C-shaped beams 18 positioned with their flange portions facing inwardly, as viewed in FIGURE 2. Each of beams 18 is independently supported by a plurality of vertically extending support beams 16 adjustably connected by bolts to the horizontally positioned beams 12.

A test sled assembly B is mounted for reciprocation along track forming beams 18. As best shown in FIGURES 3 and 4, sled assembly B is comprised of a relatively lightweight sled frame formed of a pair of longitudinal members 20 connected by a plurality of cross braces 22. Mounted at the opposite ends of each of the longitudinal members 20 are wheel truck assemblies 24. Each of these assemblies is comprised of a plurality of wheels 26 positioned so as to engage opposite sides of the upper inwardly extending flanges of track forming beams 18. Also carried in longitudinal members 20 are four horizontal guide wheels 28 positioned to engage the inner edges of the flanges on the track forming beams 18. In this manner, the test slid is prevented from having any vertical or horizontal movement between the tracks but is freely reciprocable longitudinally of the track.

Any type of component which it is desired to subject to high acceleration forces could be mounted on the test sled. However, for the purpose of this description, the sled is shown provided with means for testing vehicle passenger restraint devices, such as seat belts. These means comprise a seat 30 rigidly connected to the test sled. An anthropomorphic dummy 34 is shown positioned in the seat. The dummy 34 is held in the seat by a seat belt 32 which is to be tested.

As can be seen, by suddenly accelerating the test sled to the left as viewed in FIGURE 3, seat belt 32 will be subjected to forces identical in effect to those to which it would be subjected if the sled were moving to the right and suddenly decelerated. By controlling the rate of acceleration of the sled it is thus possible to subject the seat belt to substantially any force desired.

The particular means used to accelerate the sled to the left comprise an elongated tension member 38 connected between the sled and a winding drum 42. Means to subsequently be described are provided to suddenly rotate drum 42 and reel in the tension member 38 to thereby accelerate the sled.

Tension member 38 could be formed from a plurality of materials. However, according to the preferred embodiment of the present invention, this tension member is comprised of a wide belt or tape of woven synthetic fiber such as nylon, Dacron, or Fortisan. This construction for the tension member is preferred because of the high strength to weight ratio of these materials. This permits the tension member to have a relatively low inertia. Further, these materials are relatively flexible and are better able to withstand the high impact forces to which the tension member is subjected when the sled is suddenly accelerated.

As shown in FIGURE 2, winding drum 42 is mounted by a pair of flange members 47 on shafts 45 and 46 which are suitably supported for rotation in bearings 49 positioned on the top of two of the piers 10. The means for applying the sudden rotation to winding drum 42 comprises a flywheel 60 which is rotated by a variable speed electric motor 64 drivingly connected to the flywheel by a belt 66. A heavy-duty, air-operated clutch 62, such as the type used in presses, is selectively energizable, by apparatus to be subsequently discussed, to connect flywheel 60 to shaft 46 and thereby apply the necessary drive force to winding drum 42.

Winding drum 42 could be of a variety of constructions, however, as shown in FIGURE 6, it comprises a central shaft 51 which extends between a pair of circular side plates 52. Shaft 51 is provided with an opening 50 through which tension member 38 passes for connection to the drum by a clamp 44. A pair of reinforcing plates 58 and 59 extend between side plates 52 to give the drum the necessary rigidity.

Of particular importance to the design of winding drum 42 is the configuration of the winding surface. As is readily apparent, unless the sled can be given a substantially linear acceleration at a known rate it would not be possible to achieve usable test results. For this reason, the winding surface is formed with a special configuration. A first portion of the winding surface is formed by member 54 which extends from reinforcing plates 58 circumferentially about the drum for approximately 250°. A second winding surface portion is formed by member 56 which extends in a generally radial direction from the end of member 56 to center shaft 51. The configuration of member 56 is designed so that when the drum is suddenly rotated at a known r.p.m., takeup of tension member 38 by that portion of the winding surface formed by member 56 occurs at a predetermined rate. This permits the acceleration applied to the test sled to be readily determined. Additionally, in order to permit a range of acceleration rates to be produced, member 56 could be made adjustable to permit its configuration to be varied. Alternately, it would be possible to adjust the acceleration rate by making member 56 removable and replaceable with another of a different configuration.

In view of the above, it is apparent that a known predeterminable acceleration can be applied to sled B. However, means must be provided to stop sled B at the end of the test cycle and return it to its start position. Additionally, because of the inherent nature of the materials used for forming the tension member 38, means must be provided to apply a pre-tensioning stress to the tension member to eliminate the stretch which would occur at the start of the test cycle. For these reasons, a brake pretensioning and rewind assembly D is provided. This assembly could take a variety of forms, however, a construction as best shown in FIGURES 3 and 4 is preferred. The assembly shown includes a relatively small cable 70 connected to the right end of test sled B by an eyebolt 72 carried by a pair of cross braces 74 which extend between members 22 on the right end of the sled. Cable 70 extends over a roller 76 to a cable drum 78. Drum 78 is mounted on a shaft 82 which is supported in suitable bearings formed in support brackets 80 which are mounted at the end of frame 12. The means to apply the necessary braking force to the drum 78 comprise a disc or spot brake 84. The actual number of spot brakes 84 could obviously be varied depending upon the requirements of the system.

As can be seen, by actuating spot brake 84 the necessary stopping torque will be applied to drum 78 and, consequently, through cable 70 to sled B.

Cable drum 78 is also used to return the sled to the starting position at the end of a test cycle and apply a pre-tensioning stress to the tension member 38. Any convenient method could be used to drive cable drum 78 in the rewind and tensioning direction. According to the preferred embodiment, a manual drive is used in the interest of economy. As shown in FIGURES 3 and 4, a gear 86 is keyed to drum shaft 82 and rotated through a pinion 88 by means of a hand crank applied to pinion shaft 89.

After sled B has been moved to its starting position at the right hand end of the trackway and the proper pretension applied to elongated tension member 38, means must be provided to maintain the tension member under its pre-tension stress until the drive clutch is engaged. For this reason, a breakaway link assembly is provided. As best shown in FIGURE 5, this assembly comprises a fracture bolt 92 connected to the right end of sled B by a member 74 which extends between cross braces 22. A bracket 94 is connected to the opposite end of fracture bolt 92 and a chain extends from the bracket for adjustable connection with slot bracket 96 rigidly mounted on the right end of the trackway. Fracture bolt 92 is selected so that its strength is sufficient to hold sled B in position when tension member 38 is in its pre-tensioned condition, however, weak enough to readily break or fracture when drive clutch 62 is engaged.

Controls

Figure 7:
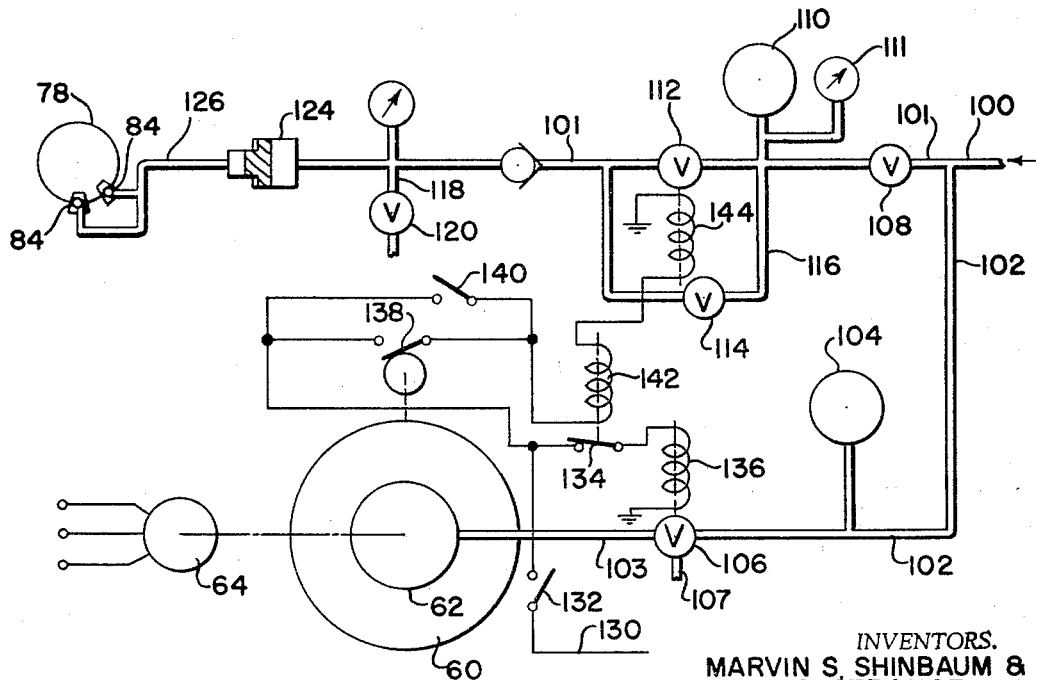
FIGURE 7 is a diagrammatic showing of the control arrangement used in the present invention.

A variety of control systems could be used to control the functioning of the above-described apparatus. One such system is shown in FIGURE 7. Primarily, this system is designed to permit control of motor speed and to assure energization of the clutch and brake at the proper time during the test cycle.

Basically, the system shown in FIGURE 7 is an electrically controlled pneumatic system. As shown, the system includes an air supply 100 of 85–90 p.s.i. connected through line 101 to air-oil booster 124, which through oil or hydraulic line 126 serves to apply actuating force to brakes 84 on cable drum 78. Line 101 is provided with various control valves, an accumulator tank 110 and pressure gauge 111. Supply 100 is also connected through line 102. Line 102 is provided with a surge tank 104 and control valve 106 and line 103 to clutch 62. Valve 106 is a three-way solenoid valve and in its de-energized position maintains line 102 closed and line 103 vented to atmosphere through line 107.

The valve and control arrangement for line 101 includes a shutoff valve 108, a normally closed solenoid valve 112 and a vent line 118 provided with a vent valve 120. A line 116, provided with a pressure control valve 114, by-passes valve 112. By-pass line 116 and pressure control valve 114 make it possible to at all times maintain a small static force on the air-oil booster, and consequently a small braking pressure on brakes 84. This is important since during the drive portion of the test cycle the cable 70 will tend to oscillate as it unwinds from cable drum 78 unless a slight retarding force is maintained on the drum.

The means used to control the energization of solenoid valves 112 and 106 at the proper time during the test cycle comprise a relatively simple electrical circuit including a power line 130 connected through a start switch 132 and a series connected normally closed solenoid switch 134 with solenoid coil 136 of valve 106. Power line 130 is also connected with solenoid coil 144 of valve 112 by parallelly connected switches 138 and 140, in series through solenoid coil 142 of switch 134. Switch 138 is a rotary limit switch operated by a cam driven from the shaft of tape drum 42. The cam is designed to open switch 138 after a limited rotation of the tape drum. This functions to cause valve 112 to be opened to thereby apply brakes 84, and also to cause switch 134 to open and de-energize solenoid 136 to permit valve 106 to move to the position where line 103 is exhausted to atmosphere and clutch 62 thereby disengaged. Switch 140 is a plunger-operated switch positioned on the track 18 and is moved to closed position by passage of the test sled. This provides a backup for rotary limit switch 138.

Also shown in FIGURE 7 is a variable speed electric motor 64 which is provided with a conventional motor speed control (not shown).

Operation

Assume that a test run has just been completed, at this times sled B will be at the left end of the track as viewed in FIGURE 1. Start switch 132, rotary limit switch 138 and track mounted switch 140 will all be closed; consequently, valve 112 will be energized open and full braking force applied to brakes 84. Also, switch 134 will be open and valve 106 in the clutch venting or disengaged position.

To prepare for the next test run, the seat, belt, dummy and desired instrumentation are prepared and checked out. Switch 132 is then opened permitting valve 112 to close. Valve 120 is then opened and the pressure acting on air-oil booster 124 vented to atmosphere to relieve the pressure on brakes 84.

With the brakes disengaged, the cable 70 is manually rewound on cable drum 78 and the sled moved to start position resetting both track switch 140 and rotary limit switch 138 to open position. A new fracture or shear bolt 92 is installed and the tension member 38 pre-tensioned by rotating cable drum 78 a slight amount further. Connecting chain 90 is then slid into slot bracket 96 to hold the tension member in its pre-tensioned condition.

With the sled in start position, vent valve 118 is closed and the necessary operating pressure supplied to accumulator tank 110 by opening valve 108. When the necessary pressure is reached, as indicated by pressure gauge 111, valve 108 is closed. At this time, main brake pressure supply valve 112 is closed, however, a small pressure is permitted to act against the brakes 84 by virtue of by-pass line 116 and pressure control valve 114. As previously explained, this provides the necessary retarding force to prevent oscillation of cable 70 during the drive portion of the test run.

When the brake pressure system has been prepared, motor 64 is started and the flywheel 60 brought up to speed. With the flywheel rotating at the desired speed as determined for example by a strobe light or tachometer, switch 132 is closed, thereby energizing coil 136 and moving valve 106 to the position wherein full pressure is supplied through line 103 to engage clutch 62. This causes rotation of tape drum 42. At the immediate start of rotation of drum 42 it is in the position wherein the cam surface is located as shown by dotted lines 56' in FIGURE 6. Thus, during approximately the first 40° of counterclockwise rotation of the drum there is no takeup of tension member 38. This provides time for the clutch to fully engage. In this manner, at the time the drum reaches the position wherein the cam surface is located as shown by solid lines 56, the clutch will be locked and the drum will be rotating at the same speed as the flywheel. Immediately after the drum has reached this position, the tension member is taken up on the cam surface. This causes the shear bolt 92 to break and the sled to be accelerated.

Because the configuration of the cam surface and the speed of rotation of the drum are known, the rate of acceleration applied to the tension member and sled are readily known.

Continued rotation of the tape drum causes the tension member to be taken up on the circumferential winding surface 54. During this portion of rotation there will be no further acceleration. At this time, the cam operator of switch 138 will have rotated to the position wherein the switch is closed. As previously explained, this causes simultaneous disengagement of the clutch and actuation of the brakes to quickly stop the sled.

In view of the above description, it is apparent that the present invention provides an extremely simple and reliable test machine which is capable of producing a wide range of acceleration rates, and which overcomes problems encountered with previous dynamic test machines.

The invention has been described in great detail sufficient to enable one skilled in the art of dynamic testing to duplicate the invention. Obviously, modifications and alterations of the preferred embodiment will occur to others upon a reading and understanding of this specification and it is our intention to include all such modifications and alterations as part of our invention insofar as they come within the scope of the appended claims.

Having thus described our invention, we claim:

1. In a dynamic test machine of the type including a guideway; a test vehicle movable along said guideway between first and second positions; a winding reel having a contoured winding surface and selectively engageable drive means for suddenly rotating the reel at a predetermined velocity, a first elongated flexible tension member connected between the test vehicle and the winding reel and adapted to be wound up on said winding reel and the velocity at which it is suddenly rotated, a predetermined acceleration will be applied to said test vehicle to move it from said first position toward said second position, the improvement comprising: braking means including a rotatable drum member provided with actuatable means for selectively applying a braking force to said drum member and a second elongated flexible tension member having one end connected to said drum and wound thereon and the other end connected to said test vehicle; and, control means for engaging said drive means when said vehicle is in said first position and, when said vehicle has moved a predetermined distance toward said second position, simultaneously disengaging said drive means and actuating said brake means.

2. The invention as defined in claim 1 wherein said control means further includes means for maintaining a relatively small predetermined braking force on said drum during the period said drive means is engaged.

3. The invention as defined in claim 1 wherein said brake means includes means for rotating said drum to return said test vehicle from said second position to said first position and to apply an adjustable predetermined tension to said first flexible member when said test vehicle is in said first position.

4. The invention as defined in claim 3 including means for maintaining said first elongated flexible tension member under said predetermined tension when said test vehicle is in said first position.

5. The invention as defined in claim 1 wherein said drive means include a flywheel and said control means include a clutch positioned between said flywheel and said winding reel.

References Cited
UNITED STATES PATENTS

| | | | |
|---|---|---|---|
| 3,001,393 | 9/1961 | Greayer | 73—12 |
| 3,200,634 | 8/1965 | Rickards | 73—12 |
| 3,218,847 | 11/1965 | Starer et al. | 73—95 |

RICHARD C. QUEISSER, *Primary Examiner.*

CHARLES E. PHILLIPS, *Assistant Examiner.*

U.S. Cl. X.R.

73—95